United States Patent Office 3,389,170
Patented June 18, 1968

3,389,170
3-ACYLAMINO-2,4,6-TRIIODO-BENZOIC ACIDS
Ernst Habicht and Georg Feth, Schaffhausen, Switzerland, assignors to Cilag-Chemie Limited, a corporation of Switzerland
No Drawing. Filed Apr. 23, 1965, Ser. No. 450,512
11 Claims. (Cl. 260—501.11)

ABSTRACT OF THE DISCLOSURE

The compounds are of the class of 2,4,6-triiodo-benzoic acids and salts thereof having an alkyloxy-alkanoyl-amino or polyalkyloxy-alkanoyl-amino substituent in the 3-position, which compounds are useful as X-ray contrast agents.

---

The present invention relates to new acylated amino acids of the general formula

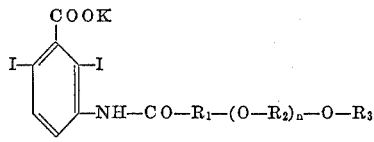

wherein the various symbols have the meaning defined below:

$R_1$ stands for —$CH_2$—,

and —$CH_2$—$CH_2$—;

$R_2$ stands for —$CH_2$—$CH_2$—,

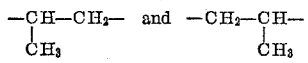

$R_3$ stands for —$CH_3$, and —$C_2H_5$;
$n$ is an integer from 0–7 inclusive; and
K stands for H or a radical of a pharmaceutically acceptable inorganic base or an organic base in ammonium form.

The new acylated amino acids of Formula I and their salts are suitable X-ray contrast agents or shade giving substances for X-ray contrast agents. They can be used in bronchograph, for urography, vasography, lymphography, salpingography, for the visualization of the bile duct, etc.

The new acylated amino acids of Formula I are prepared by reacting a compound of the formula:

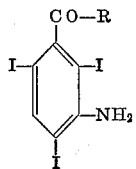
(II)

wherein R represents hydroxy or a radical which is transformable into the hydroxy group by mild hydrolysis, e.g., a lower alkoxy, with an acid halogenide of the formula:

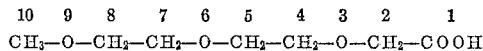

and optionally transforming the radical R of the obtained condensation product into the hydroxyl group.

The reaction is preferably carried out in an inert solvent such as, for instance, benzene, toluene, xylene, chlorobenzene, dichlorobenzene, etc.

According to the process, it is possible to either react 3-amino-2,4,6-triiodobenzoic acid with an acid halogenide of Formula III, or, for instance, to react an ester of 3-amino-2,4,6-triiodobenzoic acid with an acid halogenide of Formula III and subsequently saponifying the ester group in the obtained condensation product.

The acid halogenides of Formula III are partly known; as far as they are unknown, the process for their production is described in detail in the experimental section.

The present invention relates also to new X-ray contrast agents which, as shadow giving substance, contain at least one compound of the general Formula I. Such X-ray contrast agents may be formulated as emulsions, suspensions, solutions, etc. They may also contain substances which increase viscosity, such as for instance carboxymethyl cellulose, carboxymethylstarch, etc.

For the sake of simplicity and better comprehension, the polyalkoxy fatty acids are named as follows, exemplified with 3,6,9-trioxadecanoic acid-(1):

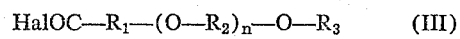

EXAMPLE I (a) 3,6-dioxa-heptanoic acid-(1).—The above named acid is prepared according to Berichte 63, p. 3117 (1930) by reaction of ethyleneglycol-monomethylether with chloroacetic acid in the presence of sodium-ethoxide. The average yields are 80% of the theoretical value. The acid boils under 0.08 mm. at 88–89° C.

(b) 3,6-dioxa-heptanoic acid-(1)-chloride.—The above mentioned chloride is prepared analogously to U.S. Pat. No. 2,769,838: 55 g. of 3,6-dioxa-heptanoic acid-(1) and 170 cc. of distilled thionyl chloride in 170 cc. of absolute benzene are stirred for 2.5 hours at 50° C. subsequently, the solution is concentrated under vacuum at approximately 50° C.; to the residue are added twice 170 cc. each of absolute toluene and the whole is again distilled under vacuum. The residue represents the above indicated acid chloride; this is not further purified, but immediately used for the further reaction.

(c) 2,4,6-triiodo-3-[(3',6'-dioxaheptanoyl-1') - amino] benzoic acid.—132 grams of 2,4,6-triiodo-3-aminobenzoic acid are heated in 2.5 liters of absolute toluene, and approximately 150 cc. of toluene are distilled off. To the boiling solution there are added 58.6 g. of the acid chloride obtained above according to paragraph (b), the latter dissolved in 50 cc. of toluene. The whole is heated to reflux under stirring for one hour. After about one hour, the escape of hydrochloric acid is finished and the end product begins to crystallize. The mass is left to stand overnight and the precipitated particles are then filtered off by suction, washed with ether and dried at 40° C. under vacuum. There are obtained 109.3 g. of crude 2,4,6-triiodo - 3-[(3',6'-dioxaheptanoyl-1'-amino]benzoic acid, melting at 193–196° C. The new acid is purified by reprecipitation with hydrochloric acid from diluted sodium hydroxide solution. The pure product, a colorless crystalline substance, melts at 196–198° C.

Solubilities: the new acid is insoluble in cold water, little soluble in hot water; it is little soluble in cold ethanol and acetone, but well soluble under hot conditions; the new acid is practically insoluble in ether, petroleum ether and chloroform. 100 cubic centimeters of water at 20° C. dissolve approximately 0.2 g. of the compound; and 100 cc. of an aqueous 10% triethyleneglycol solution dissolve approximately 0.6 g. of the compound.

(d) Following the procedures of Example 1(a), (b) and (c), 3,6-dioxa-octanoic acid-(1) (prepared by reacting ethyleneglycolmonoethylether with chloroacetic acid) may be converted to 3,6-dioxa-octanoic-acid-(1)-chloride, which in turn is reacted with 2,4,6-triiodo-3-aminobenzoic acid to yield 2,4-triiodo - 3 - [(3',6' - dioxaoctanoyl-1')-amino]-benzoic acid. Similarly, 4,7-dioxa-octanoic acid-(1) (prepared by reacting ethyleneglycol-monomethylether with β-chloropropionic acid) may be converted to its corresponding acid chloride, which in turn reacted with 2,4,6-triiodo-3-aminobenzoic acid to yield 2,4,6-triiodo-3-[(4',7'-dioxaoctanoyl-1')-amino]-benzoic acid.

EXAMPLE II (a) 3,6,9-trioxa-decanoic acid-(1).—The above mentioned acid is prepared according to Berichte 63, p. 3117 (1930) from diethyleneglycol-monomethylether and chloroacetic acid in the presence of sodium-ethoxide. The average yields are 70%. The acid boils under 0.08 mm. at 133–136° C.

(b) 3,6,9-trioxa-decanoic acid-(1) chloride.—The above named acid chloride is prepared analogously to U.S. Pat. No. 2,769,838. From 80 g. of the free acid and 185 cc. of thionylchloride there are obtained 90 g. of acid chloride.

(c) 2,4,6-triiodo-3-(3',6',9'-trioxa-decanoyl-1')-aminobenzoic acid.—154 grams of 2,4,6-triiodo-3-aminobenzoic acid are heated to boiling with 90 g. of the acid chloride obtained according to paragraph (b) in 2.9 liters of absolute toluene and worked up as indicated in Example I to yield about 172 g. of crude 2,4,6-triiodo-3-(3',6',9'-trioxa-decanoyl-1')-aminobenzoic acid, melting at 144–147° C. After reprecipitation from diluted sodium hydroxide solution with hydrochloric acid, 150 g. of a more pure product are obtained. Recrystallization from methanol results in 130 g. of the pure acid, melting at 148–150° C. The new acid dissolves very little in cold water, slightly better in hot water. It is moderately soluble in cold ethanol and cold acetone, and well soluble with heat. 100 cubic centimeters of water at 20° C. dissolve approximately 1 g. of the acid. 100 cubic centimeters of an aqueous 10% triethyleneglycol solution dissolve about 1.7 g. of the acid.

EXAMPLE III (a) 3,6,9,12-tetraoxa-tridecanoic acid-(1).—54.7 grams of sodium are dissolved in 700 g. of triethyleneglycol-monomethylether. To this solution are added, in portions, over a period of 25 minutes, 113 g. of chloroacetic acid under nitrogen atmosphere at a temperature of about 45° C. Hereby the temperature rises to approximately 100° C. Then the whole is turbinated for 2 hours at 95–100° C., allowed to stand overnight and the excess triethyleneglycol-monomethylether is steam distilled. The residue is concentrated under vacuum, the concentrate neutralized with 139 g. phosphoric acid 84% and then shaken several times with ether and then distilled under high vacuum. There are obtained 120 g. of the acid boiling under 0.05 mm. at 150–152° C.

(b) 3,6,9,12-tetroxa-tridecanoic acid-(1) chloride.—The acid chloride is prepared in exactly the same manner as described in the foregoing examples. From 100 g. of the acid and 185 cc. of thionylchloride in 185 cc. of absolute benzene there are obtained 110 g. of acid chloride.

(c) 2,4,6-triiodo-3-(3',6',9',12'-tetraoxa-tridecanoyl-1')-aminobenzoic acid.—154 grams of 2,4,6-triiodo-3-aminobenzoic acid are heated to boiling in 2.9 liters of absolute toluene with stirring. Approximately 250 cc. of toluene are distilled off. Then 110 g. of the acid chloride obtained according to paragraph (b) in a solution of 70 cc. of absolute toluene are added to the boiling solution. Addition is carried out in small portions within 15–30 minutes. The whole is heated until the escape of HCl ceases and the thus obtained solution is concentrated under vacuum. After reprecipitation from diluted sodium hydroxide solution with HCl, the product is recrystallized from acetone. There results 94 g. of 2,4,6-triiodo-3-(3',6',9',12'-tetraoxa-tridecanoyl-1')-aminobenzoic acid, melting at 102–104° C. The new acid is little soluble in cold water, very well soluble in hot ethanol and acetone; it dissolves easily in cold chloroform, but is insoluble in ether and petroleum ether. 100 cubic centimeters of water at 80° C. dissolve approximately 1.5 g. of acid. 100 cubic centimeters of a 10% triethyleneglycol solution dissolve about 2.4 g. of acid.

EXAMPLE IV 260 grams of 2,4,6-triiodo-3-aminobenzoic acid are heated in 4.9 liters of absolute toluene, distilling off about 450 cc. of the solvent. To the boiling solution there is added over a period of 20 minutes a solution of β-methoxypropionic acid chloride (93.3 g.) in 90 cc. of absolute toluene. Subsequently, the whole is boiled for 1½ hours and then left to stand for 24 hours at room temperature. Then the toluene solution is evaporated and the smeary residue triturated with ether. Filtration with suction is followed by recrystallization from methanol. Thus are obtained 85.5 g. of 2,4,6-triiodo-3-(β-methoxypropionylamino)-benzoic acid, melting at 232–234° C.

EXAMPLE V (a) 73 grams of 1-methoxypropanol-(2) are treated with small portions of sodium (total: 76.3 g.) under nitrogen atmosphere. Thereby the temperature rises to 140° C. After having been left to stand until all particles of sodium are dissolved, 157 g. of chloroacetic acid are added to the solution, which is subsequently stirred for 2.5 hours at 95° C. (internal temperature). Then the excess methoxypropanol is distilled off under vacuum. To the residue there are added 193 g. of 84% phosphoric acid; the mixture is heated shortly on the steam bath, cooled and then there are added 400 cc. of ether. The ethereal solution is dried, evaporated and the residue distilled under vacuum. There are obtained 204 g., corresponding to 83% of the theoretical value, of 4-methyl-3,6-dioxa-heptanoic acid-(1), boiling under 12 mm. at 134–137° C.

(b) 70 grams of the acid obtained according to paragraph (a) are stirred for one hour at 50° C. (internal temperature) in 150 cc. of absolute benzene and mixed with 150 cc. of distilled thionylchloride. Subsequently, the whole is fractionated under vacuum, thus obtaining 72.4 g. of a colorless oil, which represents 4-methyl-3,6-dioxaheptanoic acid chloride, boiling under 4 mm. at 51–53° C.

(c) 149 grams of 2,4,6-triiodo-3-aminobenzoic acid are heated in 2.9 liters of absolute toluene. After having distilled off about 250 cc. of the solvent, there is added dropwise a solution of 72.3 g. of the acid chloride obtained according to paragraph (b) in 70 cc. of absolute toluene. The whole is refluxed for 2 hours under stirring, left to stand for 48 hours at room temperature, and then the precipitated crystals are filtered off with suction. Reprecipitation from diluted NaOH/HCl and recrystallization from diluted dioxane results in 120 g. of 2,4,6-triiodo-3-(4'-methyl-3',6'-dioxa-heptanoylamino)-benzoic acid, which melts at 237° C. under decomposition. This substance is readily soluble in diluted alkalies and practically not soluble in diluted acids.

(d) Following the procedure of Example V(a), (b) and (c), 5-methyl-3,6-dioxa-heptanoic acid-(1) [prepared by reacting 2-methoxy-propanol-(1) with chloroacetic acid] may be converted to 5-methyl-3,6-dioxa-heptanoic acid chloride, which in turn is reacted with 2,4,6-triiodo-3-aminobenzoic acid to yield 2,4,6-triiodo-3-(5'-methyl-3',6'-dioxa-heptanoylamino)-benzoic acid.

EXAMPLE VI (a) 474 grams of tetraethyleneglycol-monomethylether are reacted in the usual manner in 700 cc. of absolute dioxane in the presence of 123 g. of sodium methylate with 108 g. of chloroacetic acid. After working up, as described in the foregoing examples, there are obtained 158 g. of 3,6,9,12,15-pentaoxahexadecanoic acid-(1). The new acid boils under 0.08 mm. at 167–170° C.

(b) From 100 g. of the acid obtained according to paragraph (a) and 155 cc. of distilled thionylchloride in 155 cc. of absolute benzene there is prepared in the usual manner the corresponding acid chloride. The yield of acid chloride is about 115 g.

(c) 129 grams of 2,4,6-triiodo-3-aminobenzoic acid are heated to boiling in 2.4 liters of absolute toluene. After distilling off 250 cc. of solvent, there is added a solution of 115 g. of the acid chloride obtained according to paragraph (b) in 70 cc. of toluene. The whole is boiled with stirring for one hour and then left to stand for 2 days at 20° C. The toluene solution is then decanted from the semi-solid substance and the flask-residue shaken with diluted sodium hydroxide. After filtration with Celite, the whole is acidified, thereby precipitating a colorless crystal mass. This is dried, digested with ethylacetate and filtered with suction. There are obtained 118 g. of 2,4,6-triiodo - 3-(3′,6′,9′,12′,15′-pentaoxa-hexadecanoylamino)-benzoic acid, melting at 75–78° C. The new acid is readily soluble in diluted alkalies, and practically not soluble in diluted acids, ethylacetate and ether.

EXAMPLE VII (a) 700 grams of pentaethyleneglycol-monomethylether are reacted in the usual manner in the presence of 150 g. of sodium methylate in 3000 cc. of dioxane with 131 g. of chloroacetic acid. Working up as described in the foregoing examples results in 246 g. of a practically colorless oil, which boils under 0.07 mm. at 203–207° C. The colorless oil represents 3,6,9,12,15,18-hexaoxanonadecanoic acid.

(b) Heating 120 g. of the acid obtained according to paragraph (a) in the usual manner with 160 cc. of thionylchloride in 160 cc. of absolute benzene and subsequent working up as in the previous examples results in 130 g. of the corresponding chloride.

(c) 133 grams of 2,4,6-triiodo-3-aminobenzoic acid are heated in 2.5 liters of absolute toluene and 250 cc. of the solvent are distilled off. Subsequently, 130 g. of the acid chloride obtained according to paragraph (b) are added and the whole heated to boiling for 2 hours with stirring. Then the mixture is left to stand for 48 hours; the toluene solution is decanted from the semi-solid residue and the latter dissolved in diluted sodium hydroxide. After filtration with Celite, the filtrate is acidified and the precipitate filtered off with suction. The latter is dried and recrystallized from ethylacetate. There are obtained 50 g. of 2,4,6-triiodo-3-(3′,6′,9′,12′,15′,18′-hexaoxa - nonadecanoylamino)-benzoic acid, which melts at 94–96° C. The new acid is readily soluble in diluted alkalies and little soluble in diluted acids.

(d) Following the procedure of Example VII(a), (b) and (c), 2,4,6-triiodo-3-(3′,6′,9′,12′,15′,18′,21′,24′ - octoxa-pentacosanoylamino)-benzoic acid may be prepared by starting with the appropriate polyethyleneglycol-monomethylether.

EXAMPLE VIII (I) 2.5 grams of 2,4,6-triiodo-3-[(3′,6′,9′-trioxa-decanoyl-1′)-amino]benzoic acid are dissolved in 300 cc. of hot absolute toluene. The solution is filtered and to the filtrate are added 5 cc. of diethylamine. The whole is left standing overnight and the precipitated crystal mass is filtered off with suction, washed with toluene and ether and dried in the exsiccator. There are obtained 2.6 g. of a colorless salt, diethylammonium 2,4,6-triiodo-3-(3′,6′,9′-trioxa-decanoyl-1′)-amino benzoate which melts at 163–166° C. The new salt readily dissolves in water, dissolves moderately in cold alcohol and well in hot alcohol. Other amino salts of 2,4,6-triiodo-3-[(3′,6′,9′-trioxa-decanoyl-1′)-amino]benzoic acid are suitably obtained by using, for example, ethylamine, ethanolamine, diethylaminoethanol, morpholinoethanol, dimethylaminoacetamide, piperidinoacetamide, pyrrolidinoacetamide, morpholinoacetamide and piperazine in lieu of the diethylamine above.

(II) 3.4 grams of 2,4,6-triiodo-3-(3′,6′,9′-trioxa-decanoyl-1′)-aminobenzoic acid are added to a solution of 0.11 g. of sodium in 10 cc. of absolute ethanol. The whole is left to stand for 24 hours in the refrigerator and the precipitated crystals are suction-filtered off. Washing with little ice-cold ethanol and ether is followed by drying in exsiccator. There are obtained 2.4 g. of the sodium salt of 2,4,6-triiodo-3-(3′,6′,9′-trioxa-decanoyl-1′)-aminobenzoic acid, melting at 145–147° C. This salt is readily soluble in cold water and cold ethanol and is fairly readily soluble in hot dioxane.

EXAMPLE IX 154 grams of 2,4,6-triiodo-3-amino-benzoic acid are heated to boiling in 2.9 liters of absolute toluene. After distilling off 250 cc. of the solvent, there is added a solution of 48.7 g. methoxyacetic-acid-chloride in 70 cc. of toluene. The whole is boiled with stirring for one hour and then left to stand for one day at 20° C. The precipitated crystals are filtered off with suction. Reprecipitation from diluted sodium hydroxide solution with hydrochloric acid gives a pure product, 2,4,6-triiodo-3-(β-methoxy-acetylamino)-benzoic acid, dec. 250° C.

The acids of this invention can be used in free form or in salt form, depending on the kind of application desired. For salt formation, the following inorganic pharmaceutically acceptable bases can be used: alkali and alkaline earth hydroxides such as sodium hydroxide, calcium hydroxide, ammonium hydroxide, etc.; as pharmaceutically acceptable organic bases, the following can be used: lower alkylamines such as methylamine, ethylamie, propylamine, butylamine, dimethylamine, diethylamine, dipropylamine, dibutylamine and the like; lower alkanolamines such as ethanolamine, diethanolamine, triethanolamine and the like; di-lower alkylamino-lower alkanols such as diethylaminoethanol, dimethylaminoethanol, dipropylaminoethanol and the like; morpholinoethanol; di-lower alkylaminoacetamides such as diethylaminoacetamide, dimethylaminoacetamide and the like; piperidinoacetamide, pyrrolidinoacetamide, morpholinoacetamide, piperazine and N-lower alkyl substituted piperazines such as N-methylpiperazine, N,N′-dimethylpiperazine and the like; piperazinoethanol, piperazine-N,N′-diethanol, glucamine, N-methyl-glucamine, N-ethylglucamine, etc. Thus, K in Formula I may be an unsubstituted or mono- or disubstituted amino salt.

What is claimed is:

1. A chemical compound having the formula:

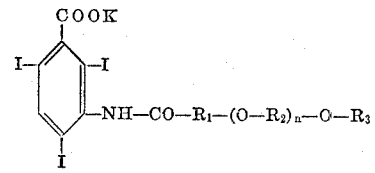

wherein $R_1$ is selected from the group consisting of —$CH_2$—,

and —$CH_2$—$CH_2$; $R_2$ is selected from the group consisting of —$CH_2$—$CH_2$—,

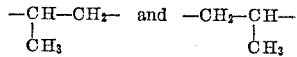

$R_3$ is selected from the group consisting of methyl and ethyl; $n$ is an integer from 0 to 7; and K is a member selected from the group consisting of hydrogen, the radical of an inorganic pharmaceutically acceptable base and the radical of an organic pharmaceutically acceptable base in ammonium form.

2. 2,4,6-triiodo-3-[(3′,6′-dioxaheptanoyl-1′) - amino]-benzoic acid.

3. 2,4,6-triiodo-3-(3′,6′,9′-trioxa-decanoyl-1′) - aminobenzoic acid.

4. 2,4,6-triiodo-3-(3',6',9',12'-tetraoxa-tridecanoyl-1')-aminobenzoic acid.

5. 2,4,6-triiodo-3-(β-methoxypropionylamino)-benzoic acid.

6. 2,4,6-triiodo-3-(4'-methyl-3',6'-dioxa-heptanoyl-amino)-benzoic acid.

7. 2,4,6-triiodo-3-(3',6',9',12',15'-pentaoxahexadecanoylamino)-benzoic acid.

8. 2,4,6-triiodo-3-(3',6',9',12',15',18'-hexaoxanonadecanoylamino)-benzoic acid.

9. Diethylammonium 2,4,6-triiodo-3-(3',6',9'-trioxa-decanoyl-1')-amino benzoate.

10. Sodium 2,4,6-triiodo-3-(3',6',9'-trioxa-decanoyl-1')-aminobenzoate.

11. 2,4,6-triiodo-3-(β-methyl-acetylamino)-benzoic acid.

References Cited

UNITED STATES PATENTS

| | | | |
|---|---|---|---|
| 2,064,944 | 12/1936 | Rietmann et al. | 26—297 |
| 2,776,241 | 1/1957 | Priewe | 167—95 |
| 3,076,024 | 1/1963 | Larsen | 260—519 |
| 3,252,985 | 5/1966 | Habicht et al. | 167—95 |

OTHER REFERENCES

Wallingford, J., of the Am. Pharmaceutical Assn., vol. 42, No. 12, December 1953, pp. 721–8.

BERNARD HELFIN, *Acting Primary Examiner.*

LORRAINE A. WEINBERGER, *Examiner.*

M. WEBSTER, M. W. GLYNN, *Assistant Examiners.*

UNITED STATES PATENT OFFICE
CERTIFICATE OF CORRECTION

Patent No. 3,389,170

June 18, 1968

Ernst Habicht et al.

It is hereby certified that error appears in the above numbered patent requiring correction and that the said Letters Patent should read as corrected below.

Column 1, lines 20 to 25, the formula should appear as shown below:

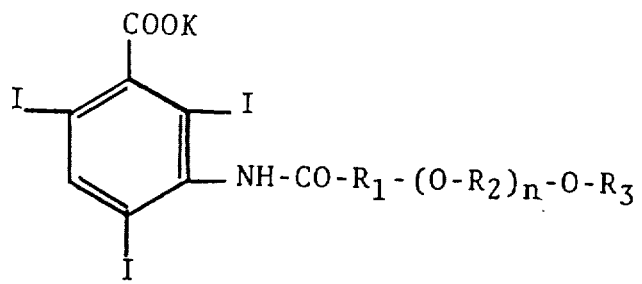

line 46, "bronchograph" should read -- bronchography --. Column 2, line 51, "-1'-" should read -- -1')- --; line 69, "2,4-triiodo" should read -- 2,4,6-triiodo --. Column 4, line 18, "73" should read -- 473 --. Column 7, line 15, "methyl" should read -- methoxy --.

Signed and sealed this 11th day of November 1969.

(SEAL)
Attest:

EDWARD M. FLETCHER, JR.
Attesting Officer

WILLIAM E. SCHUYLER, JR.
Commissioner of Patents